US010706972B2

(12) United States Patent
Triplett et al.

(10) Patent No.: US 10,706,972 B2
(45) Date of Patent: Jul. 7, 2020

(54) FUEL BUNDLE FOR A LIQUID METAL COOLED NUCLEAR REACTOR

(71) Applicant: GE-Hitachi Nuclear Energy Americas LLC, Wilmington, NC (US)

(72) Inventors: Brian S. Triplett, Wilmington, NC (US); Eric P. Loewen, Wilmington, NC (US); Brett J. Dooies, Wilmington, NC (US); Scott L. Pfeffer, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 693 days.

(21) Appl. No.: 15/437,149

(22) Filed: Feb. 20, 2017

(65) Prior Publication Data
US 2017/0236602 A1     Aug. 17, 2017

Related U.S. Application Data

(62) Division of application No. 13/456,640, filed on Apr. 26, 2012, now Pat. No. 9,576,685.

(51) Int. Cl.
| *G21C 3/32* | (2006.01) |
| *G21C 3/338* | (2006.01) |
| *G21C 3/336* | (2006.01) |
| *G21C 15/28* | (2006.01) |
| *G21C 1/03* | (2006.01) |

(52) U.S. Cl.
CPC ............. *G21C 3/338* (2013.01); *G21C 3/336* (2013.01); *G21C 15/28* (2013.01); *G21C 1/03* (2013.01); *Y02E 30/40* (2013.01)

(58) Field of Classification Search
CPC . G21C 3/18; G21C 3/33; G21C 3/332; G21C 3/336
See application file for complete search history.

(56) References Cited

U.S. PATENT DOCUMENTS

| 3,687,805 | A | * | 8/1972 | Desbois | ................. G21C 3/336 376/436 |
| 3,964,968 | A | | 6/1976 | Kurilkin et al. | |
| 4,005,521 | A | | 2/1977 | Kaplan et al. | |
| 4,056,441 | A | | 11/1977 | Marmonier et al. | |
| 4,147,591 | A | | 4/1979 | Mild | |

(Continued)

FOREIGN PATENT DOCUMENTS

| CN | 1767076 A | 5/2006 |
| CN | 101335058 A | 12/2008 |

(Continued)

OTHER PUBLICATIONS

Decision of Refusal issued in connection with corresponding JP Application No. 2015-509021 dated Sep. 19, 2017.

(Continued)

*Primary Examiner* — Marshall P O'Connor
(74) *Attorney, Agent, or Firm* — Harness, Dickey & Pierce, P.L.C.

(57) ABSTRACT

In one embodiment, the fuel bundle for a liquid metal cooled reactor includes a channel, a nose assembly secured to a lower end of the channel, and a plurality of fuel rods disposed within the channel. At least one of the fuel rods has at least one guard ring surround the fuel rod and spacing the fuel rod from adjacent fuel rods.

11 Claims, 5 Drawing Sheets

(56) References Cited

U.S. PATENT DOCUMENTS

| | | | |
|---|---|---|---|
| 4,462,958 A | 7/1984 | Lacko et al. | |
| 4,769,201 A | 9/1988 | Chiuminatta et al. | |
| 4,769,210 A | 9/1988 | Chiuminatta et al. | |
| 4,818,479 A | 4/1989 | Christiansen et al. | |

FOREIGN PATENT DOCUMENTS

| | | | |
|---|---|---|---|
| CN | 201242873 Y | 5/2009 | |
| FR | 2281632 A1 | 3/1976 | |
| JP | S59-103299 A | 6/1984 | |
| JP | S60-127490 A | 7/1985 | |
| JP | 55-80800 B2 | 8/2014 | |

OTHER PUBLICATIONS

Korean Office Action dated Aug. 6, 2019 in corresponding Korean Application No. 10-2014-7031872, with an English language translation.

PCT Search Report issued in connection with corresponding WO Patent Application No. US2013/036865 dated Oct. 24, 2013.

English Translation of Chinese Office Action issued in connection with corresponding CN Application No. 201380022376.6 dated Feb. 29, 2016.

\* cited by examiner

FUEL BUNDLE FOR A LIQUID METAL COOLED NUCLEAR REACTOR

PRIORITY STATEMENT

This application is a divisional application of U.S. patent application Ser. No. 13/456,640, filed on Apr. 26, 2012, and claims priority under 35 U.S.C. § 121, the entire contents of which is incorporated by reference in its entirety.

BACKGROUND OF THE INVENTION

Field of the Invention

Example embodiments relate generally to liquid metal cooled nuclear reactors, and more particularly, to a fuel bundle for a liquid metal cooled nuclear reactor.

Related Art

Liquid metal cooled nuclear reactors such as sodium cooled fast reactors may suffer from thermal striping. Thermal striping occurs when hot and cold spots develop in the sodium flow exiting the fuel bundles. These hot and cold spots cause thermal stresses in the upper part of the primary vessel that can be damaging over time.

SUMMARY OF INVENTION

In one embodiment, the fuel bundle for a liquid metal cooled reactor includes a channel, a nose assembly secured to a lower end of the channel, and a plurality of fuel rods disposed within the channel. At least one of the fuel rods has at least one guard ring surrounding the fuel rod and spacing the fuel rod from adjacent fuel rods.

In another embodiment, the fuel bundle for a liquid metal cooled reactor includes a channel, a nose assembly secured to a lower end of the channel, and a plurality of fuel rods disposed within the channel. At least one of the plurality of fuel rods is a wrapped rod. The wrapped rod is helically wrapped with a wire, and at least one of the plurality of fuel rods is not a wrapped rod.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
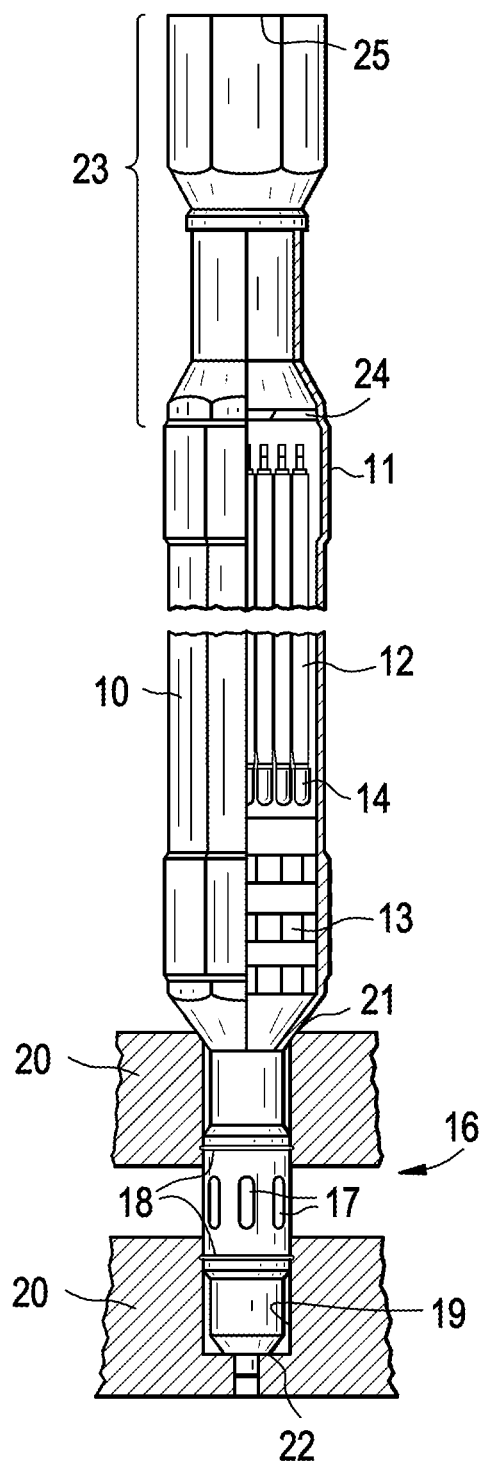
FIG. 1 illustrates a fuel bundle for a liquid metal cooled nuclear reactor according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The fuel bundle or assembly is the major heat generating component of the reactor core in a nuclear power plant. The fuel bundle design in a liquid metal cooled reactor such as a liquid metal fast breeder reactor produces energy by means of a high integrity assembly of fissionable material that can be arranged in a critical array in the reactor core and can be readily cooled by liquid metal such as sodium at the reactor design conditions.

FIG. 1 illustrates a fuel bundle for a liquid metal cooled nuclear reactor according to an example embodiment. In particular, the fuel bundle of FIG. 1 will be described with respect to a sodium cooled nuclear reactor. As shown, the fuel bundle includes a hexagonal channel or casing 10 having a plurality of lateral load pads 11 on the upper external surface and containing therein a plurality of fuel rods 12 in the upper region and an orifice/shield section 13 in the lower region. The fuel rods 12 are secured at the lower ends thereof in a fuel rod support 14. The lateral load pads 11 function to space the fuel assemblies in the reactor core to allow for fuel assembly insertion and distortion, and minimize friction due to surface contact in sodium coolant. A nose subassembly 16 is secured to the lower end of channel 10 and includes a plurality of sodium inlets 17 for directing sodium coolant into channel 10 and having seals 18 on opposite ends of inlets 17 for preventing leakage of the sodium between the nose subassembly 16 and an opening 19 in associated support structure 20 within which subassembly 16 is located. Fuel assembly support points on structure 20 are indicated at 21 and 22. A top end subassembly 23 is secured to the upper end of channel 10, with the sodium coolant having passed upwardly around fuel rods 12, passing through an internal mixer 24 in the upper end of channel 10 and exhausting through an outlet indicated at 25 in the top end subassembly 23.

Each fuel rod 12 is a long, hollow, stainless steel or stainless type alloy (e.g., HT9) tube with a central region containing, for example, plutonium-uranium metal fuel slugs bordered above and below by a region of uranium axial blanket pellets, and can, of course, be used in a radial blanket arrangement. It will be understood, that many variations of fuel exist and the embodiments are not limited to this example. A welded stainless steel plug seals the tube at the bottom. The region above the upper blanket contains a fission gas plenum section and a fuel column hold-down device and is sealed at the top by a similar plug. The duct channel assembly (components 10, 16 and 23) is constructed of stainless steel or stainless-type alloy and thus compatible with the liquid sodium coolant.

Figure 2A:
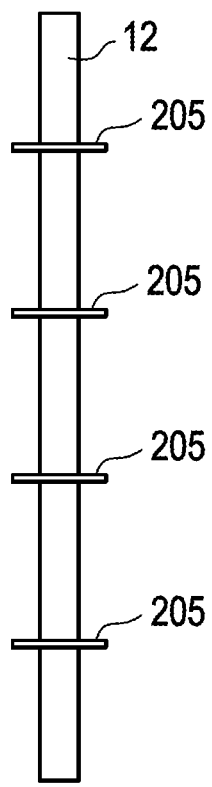
FIG. 2A illustrates an example of a fuel rod according to one embodiment.

FIG. 2A illustrates an example of a fuel rod according to one embodiment. In this embodiment, instead of having a spacer wire wrapped there around to space the fuel rods 12 from adjacent rods and the interior surface of channel 10, at least one of the fuel rods 12 includes at least one guard ring 205. While four guard rings 205 are shown in FIG. 2A, it will be understood the fuel rod 12 may include any number of guards rings.

Figure 2B:
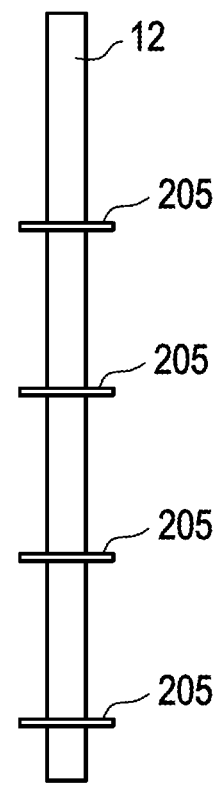
FIG. 2B illustrates a fuel rod adjacent to the fuel rod shown in FIG. 2A.

FIG. 2B illustrates a fuel rod adjacent to the fuel rod shown in FIG. 2A. As shown, the adjacent fuel rod may have one or more guard rings disposed at different positions along a longitudinal length thereof than the positions of the guard rings on the fuel rod of FIG. 2A.

Figure 3A:
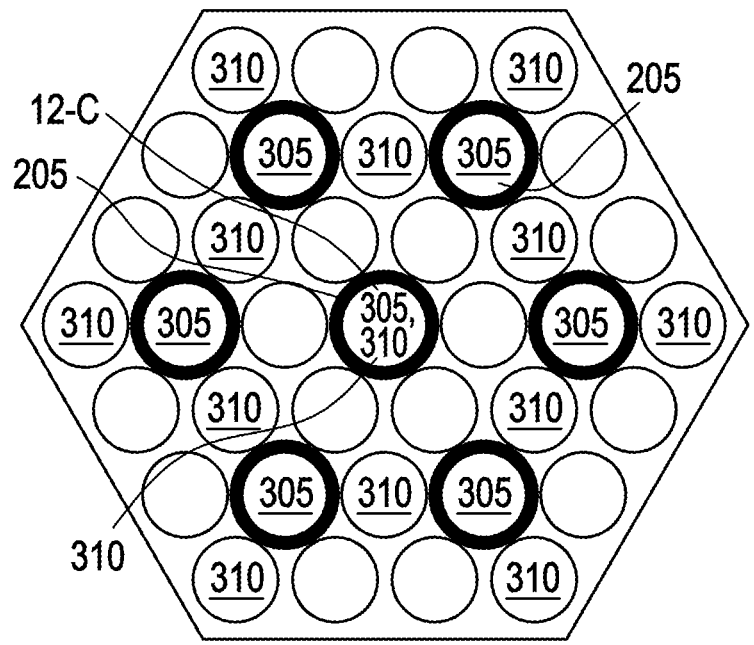
FIG. 3A illustrates a top down cross-section view of the fuel rods at 1 meter from the bottom of the fuel rods.
Figure 3B:
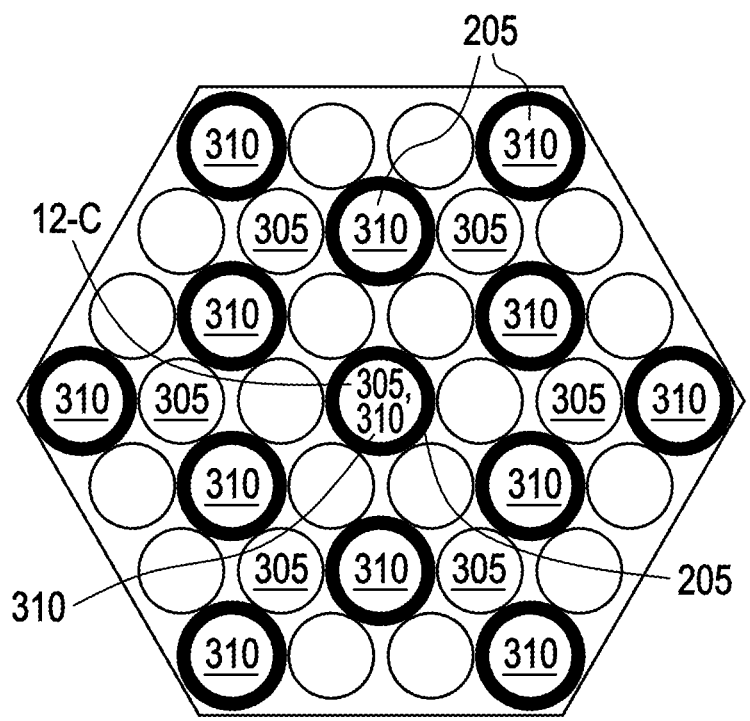
FIG. 3B illustrates a top down cross-section view of the fuel rods at 2 meters from the bottom of the fuel rods.

In one embodiment, the fuel rods 12 of the reactor may be divided into two or more sets. The fuel rods 12 in each set may have the same pattern of guard rings 205 along the longitudinal length thereof, and the different sets may have different guard ring patterns. Still further, one or more fuel rods 12 may be included in more than one set. FIGS. 3A and 3B illustrate an example embodiment of such an arrangement. FIG. 3A illustrates a top down cross-section view of the fuel rods at 1 meter from the bottom of the fuel rods, and shows the guard rings 205 of fuel rods in a first set 305 and second set 310 at 1 meter from the bottom of the fuel rods 12. FIG. 3B illustrates a top down cross-section view of the fuel rods at 2 meters from the bottom of the fuel rods, and shows the guard rings 205 of fuel rods in the first set 305 and the second set 310 at 2 meters from the bottom of the fuel rods. As shown, the center fuel rod 12-C belongs to both sets. The pattern shown in FIG. 3A may be repeated at each odd meter interval, and the pattern shown in FIG. 3B may be repeated at each even meter interval. As will be appreciated from FIGS. 3A and 3B some of the fuel rods may not include any guard rings 205. It will also be understood, that the more than two sets and more than two patterns may be employed. It will further be understood that the embodiments are not limited to the disclosed intervals, instead any interval (e.g., 0.5 meters) may be used.

Eliminating the use of wire wraps as the spacing element, reduces bulk sodium rotation within a bundle and promotes good mixing of the sodium flow inside the core region, reducing thermal striping.

Figure 4:
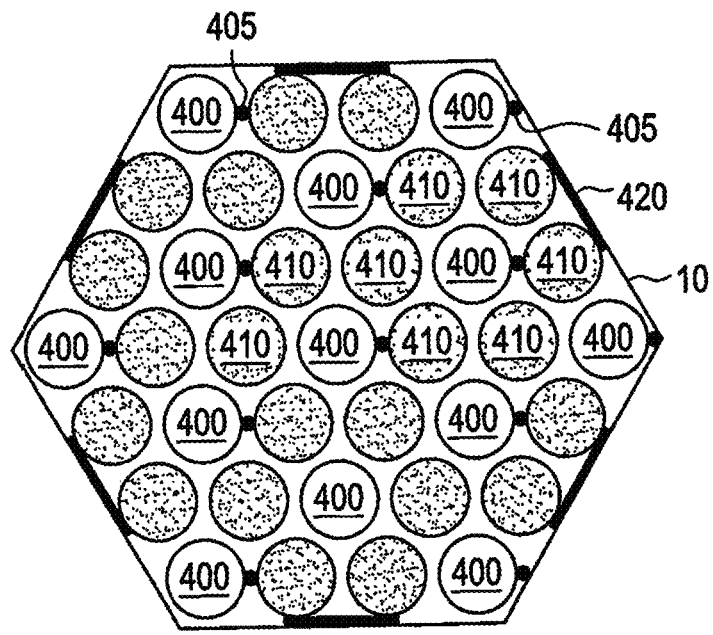
FIG. 4 illustrates a top down cross section view of the fuel rods according to another embodiment.

FIG. 4 illustrates a top down cross section view of the fuel rods according to another embodiment. In this embodiment, some of the fuel rods 12, but not all of the fuel rods 12 are helically wrapped by wires 405. Namely, according to one embodiment, at least one fuel rod is a wrapped rod (i.e., is helically wrapped by a wire), and at least one fuel rod 12 is not a wrapped rod. In the embodiment shown in FIG. 4, each of the wrapped rods 400 has unwrapped fuel rods 410 adjacent thereto. Still further, FIG. 4 shows that tabs 420 may be attached to interior walls of the channel 10 to space unwrapped rods 410 away from the walls of the channel 10.

Figure 5:
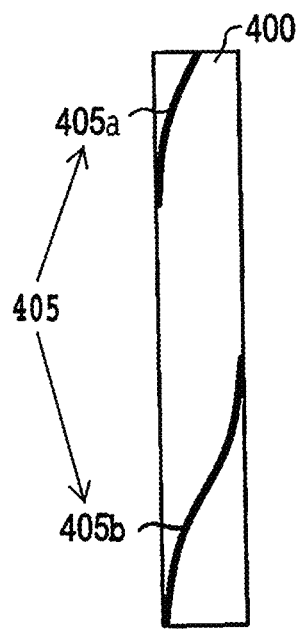
FIG. 5 illustrates a wrapped rod, and shows the helical wrapping of the wire along the longitudinal length of the fuel rod.
Figure 6:
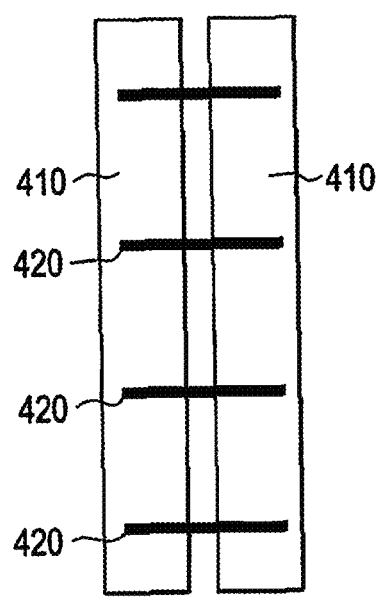
FIG. 6 illustrates the tabs projecting from a wall of the channel along the longitudinal length of a two adjacent unwrapped rods.

FIG. 5 illustrates a wrapped rod 400, and shows the helical wrapping of the wire 405 along the longitudinal length of the fuel rod, where wire portions 405a/405b are either one single wire, or two separate wire portions. FIG. 6 illustrates the tabs 420 projecting from a wall of the channel 10 along the longitudinal length of a two adjacent unwrapped rods 410. In one embodiment, the wires 405 are constructed of material such as 304 stainless steel (SS), 316 SS, and PE-16. In one embodiment, the tabs 420 are constructed of material such as 304 SS, 316 SS, and PE-16.

Figure 7:
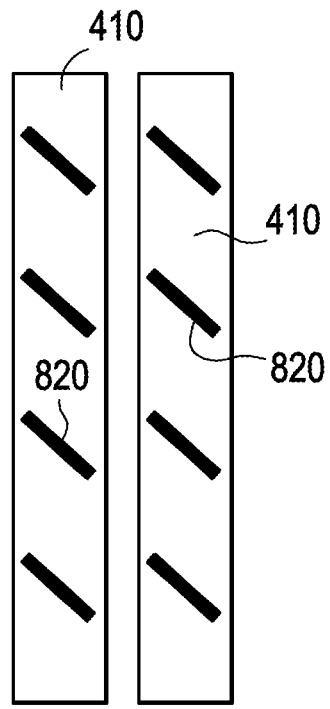
FIG. 7 illustrates another embodiment of the tabs.

FIG. 7 illustrates another embodiment of the tabs. In this embodiment, the tabs 820 are formed having a desired angle or orientation. The orientation of the tabs 820 may be the opposite of the orientation of the wires 205, 405 of the wrapped rods.

Figure 8:
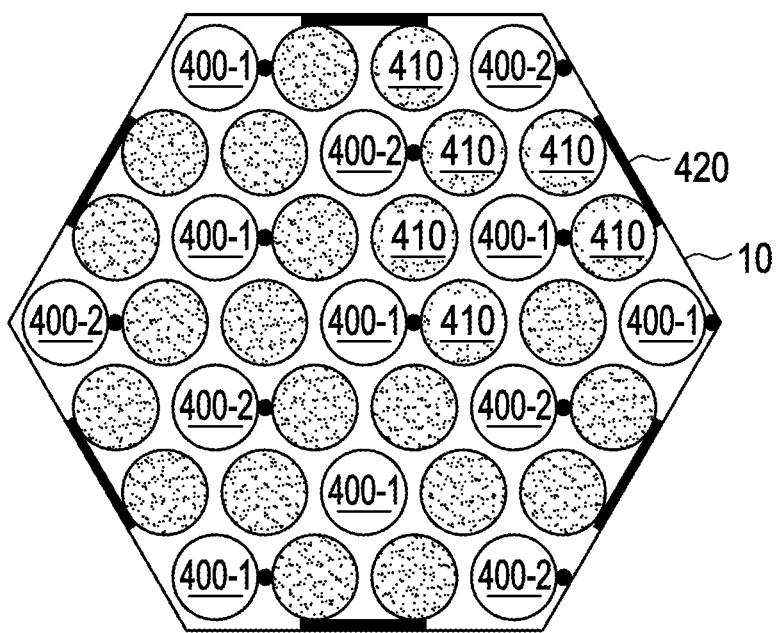
FIG. 8 illustrates a top down cross-section view of the fuel rods according to another embodiment.
Figure 9:
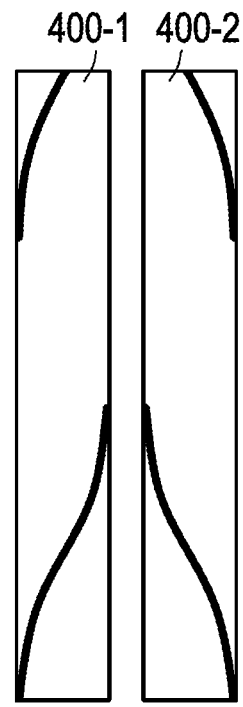
FIG. 9 illustrates two wrapped fuel rods where the wire wrappings have opposite orientations to one another.

FIG. 8 illustrates a top down cross-section view of the fuel rods according to another embodiment. In this embodiment, the wrapped rods 400 are divided into a first set 400-1 and a second set 400-2. The wrapped rods 400 of the first set 400-1 are helically wrapped according to a same first orientation. The wrapped rods 400 of the second set 400-2 are helically wrapped according to a same second orientation, where the second orientation is different from the first orientation. For example, as shown in FIG. 9, the second orientation may be opposite to the first orientation.

Reducing the number of wrapped rods, and/or changing the orientation of the wire wrapping the wrapped rods, reduces bulk sodium rotation within a bundle and promotes good mixing of the sodium flow inside the core region, reducing thermal striping.

By reducing thermal striping, thermal stresses on the fuel bundle internal components are reduced, thereby extending the lifetime of the equipment.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A fuel bundle for a liquid metal cooled reactor, comprising:
 a channel with walls;
 a nose assembly secured to a lower end of the channel;
 a plurality of fuel rods disposed within the channel, at least one first fuel rod, of the plurality of fuel rods, is a wrapped rod, the wrapped rod being helically wrapped with one or more wires,
 wherein each of the fuel rods, of the plurality of fuel rods, that are directly adjacent to the at least one first fuel rod, are unwrapped rods.

2. The fuel bundle of claim 1, wherein the fuel bundle includes more than one wrapped rod.

3. The fuel bundle of claim 2, wherein the one or more wires of the more than one wrapped rod have a same orientation.

4. The fuel bundle of claim 3, further comprising:
 tabs affixed to at least one first wall, of the walls, to space at least some of the plurality of fuel rods away from the at least one first wall.

5. The fuel bundle of claim 1, wherein the at least one first fuel rod includes a first set of wrapped rods and a second set of wrapped rods, the one or more wires of the first set of wrapped rods having a first orientation, the one or more wires of the second set of wrapped rods having a second orientation, and the first orientation is different from the second orientation.

6. The fuel bundle of claim 5, further comprising:
 tabs affixed to at least one first wall, of the walls, to space at least some of the plurality of fuel rods away from the at least one first wall.

7. The fuel bundle of claim 4, wherein the tabs are oriented horizontally relative to a vertical orientation of the plurality of fuel rods.

8. The fuel bundle of claim 4, wherein the tabs are oriented diagonally relative to a vertical orientation of the plurality of fuel rods.

9. The fuel bundle of claim 1, wherein each one of the one or more wires is helically wrapped around one single fuel rod of the plurality of fuel rods.

10. The fuel bundle of claim 1, wherein the one or more wires includes a plurality of wires, and each of the plurality of wires is helically wrapped around one single fuel rod of the plurality of fuel rods.

11. The fuel bundle of claim 4, wherein each of the tabs tangentially contacts one or more of the plurality of fuel rods, but does not extend around a periphery of the fuel rods.

* * * * *

UNITED STATES PATENT AND TRADEMARK OFFICE
CERTIFICATE OF CORRECTION

PATENT NO.         : 10,706,972 B2
APPLICATION NO.    : 15/437149
DATED              : July 7, 2020
INVENTOR(S)        : Brian S. Triplett et al.

Page 1 of 1

It is certified that error appears in the above-identified patent and that said Letters Patent is hereby corrected as shown below:

On the Title Page

(56) References Cited

Column 2, U.S. PATENT DOCUMENTS, Line 8 should read:
3,687,805 A*   8/1972    Desbois 3,964,968 A    6/1976    Kurilkin et al.
4,005,521 A    2/1977    Kaplan et al.
4,056,441 A    11/1977   Marmonier et al.
4,147,591 A    4/1979    Miki On Page 2, Column 1, U.S. PATENT DOCUMENTS, Line 1 should read:
4,462,958 A    7/1984    Lacko et al.
4,796,210 A    9/1988    Campbell
4,818,479 A    4/1989    Christiansen et al.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*